(12) United States Patent
Ragsdale

(10) Patent No.: US 7,871,121 B1
(45) Date of Patent: Jan. 18, 2011

(54) AIR DAM DEVICE FOR TRUCKS

(76) Inventor: Edward R. Ragsdale, 7783 Trousdale Ferry Pike, Lebanon, TN (US) 37090

(*) Notice: Subject to any disclaimer, the term of this patent is extended or adjusted under 35 U.S.C. 154(b) by 155 days.

(21) Appl. No.: 12/395,175

(22) Filed: Feb. 27, 2009

(51) Int. Cl.
B62D 35/00 (2006.01)

(52) U.S. Cl. .................. 296/180.2; 296/180.1

(58) Field of Classification Search ........... 293/112, 293/113, 115, 120; 296/180.1, 180.2; D12/169, D12/196, 172
See application file for complete search history.

(56) References Cited

U.S. PATENT DOCUMENTS

| 2,036,560 | A |   | 4/1936  | Backus |
|-----------|---|---|---------|--------|
| 3,869,166 | A |   | 3/1975  | Burst et al. |
| 4,119,339 | A |   | 10/1978 | Heimburger |
| 4,291,911 | A |   | 9/1981  | Gallmeyer |
| 4,585,262 | A |   | 4/1986  | Parks |
| D287,581  | S |   | 1/1987  | Herpel |
| 4,758,037 | A |   | 7/1988  | Suzuki et al. |
| 4,904,016 | A | * | 2/1990  | Tatsumi et al. ........... 296/180.5 |
| 4,915,441 | A |   | 4/1990  | Nitzke |
| 6,079,769 | A |   | 6/2000  | Fannin et al. |
| 6,964,441 | B2| * | 11/2005 | Ariga et al. .............. 296/180.1 |

* cited by examiner

Primary Examiner—Lori L Lyjak

(57) ABSTRACT

An aerodynamic air dam device comprising a polychloroprene panel adapted for mounting on the front bumper of a vehicle, wherein the polychloroprene panel can wrap around the outer side corners of the bumper; a mounting strip positioned along the top edge of the panel for holding the panel in place by clamping the panel between the mounting strip and the bumper; a bolt for inserting through a coinciding strip aperture, panel aperture, and bumper aperture of a vehicle, wherein the bolt together with a nut secure the mounting strip and the panel to the bumper.

5 Claims, 4 Drawing Sheets

AIR DAM DEVICE FOR TRUCKS

FIELD OF THE INVENTION

The present invention is directed to an accessory for a truck or a car bumper. More particularly, the present invention is directed to an aerodynamic air dam for attaching to the bumper of a truck or car for improved energy consumption.

BACKGROUND OF THE INVENTION

Air dams are devices made of metal or plastic for attaching to front bumpers of vehicles such as trucks and cars. Generally, air dams are intended to enhance the aerodynamics of the vehicle by blocking the flow of turbulent air underneath the chassis of the vehicle. The present invention features an improved aerodynamic air dam for attaching to a bumper of a truck or a car.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
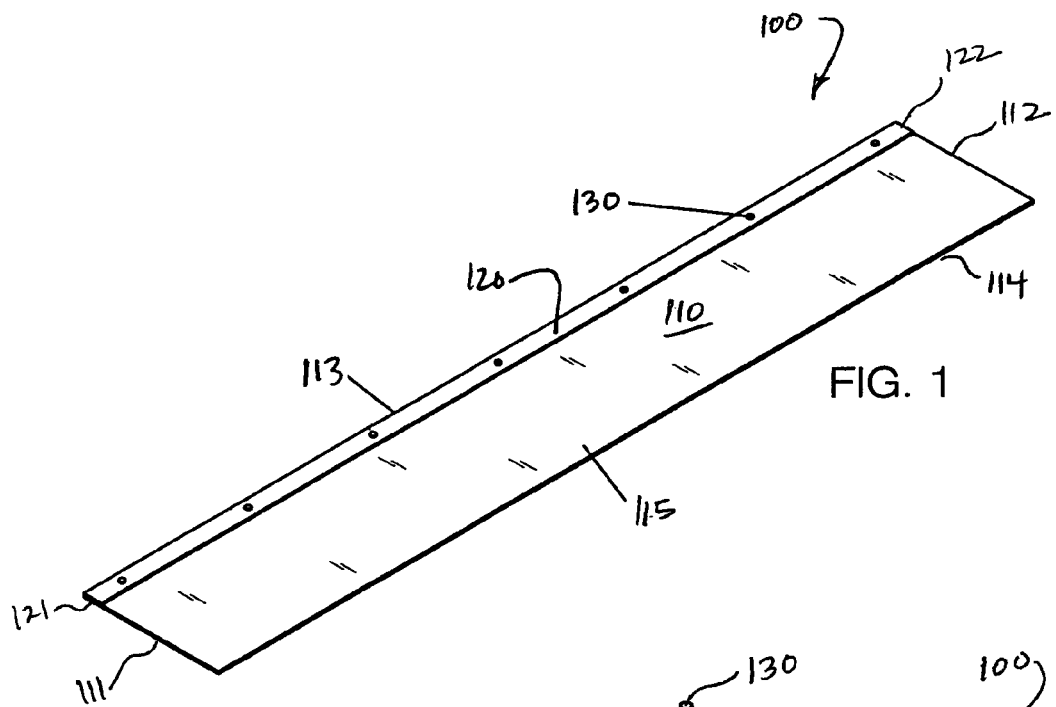
FIG. 1 is a perspective view of the air dam device of the present invention.
Figure 2:
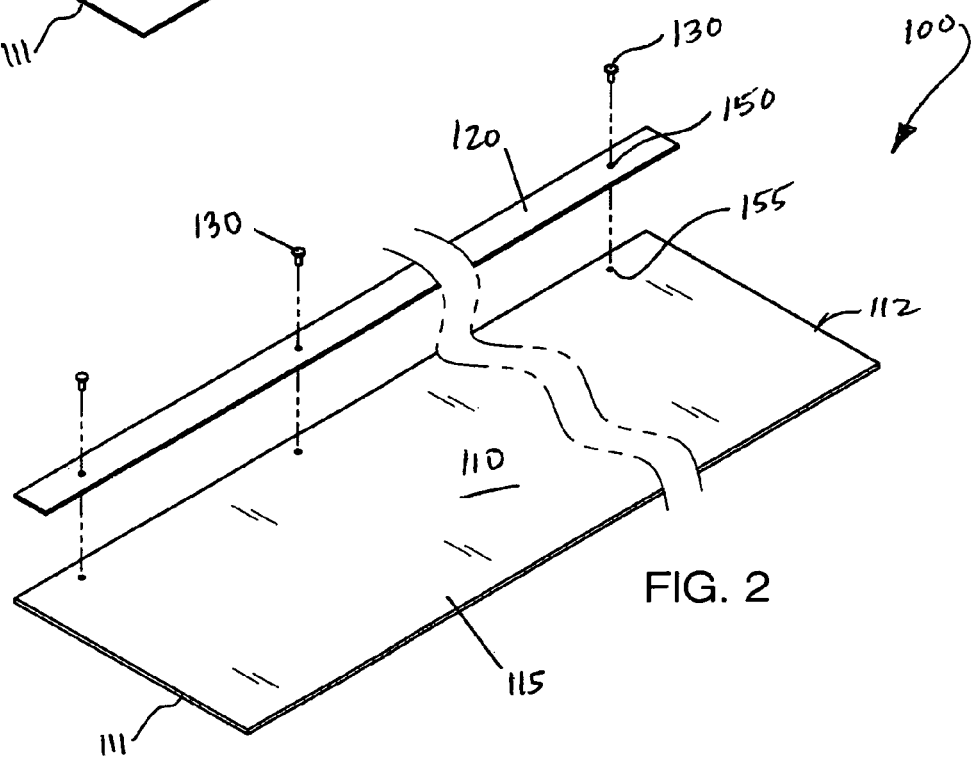
FIG. 2 is a perspective view and exploded view of the air dam device of the present invention.
Figure 3:
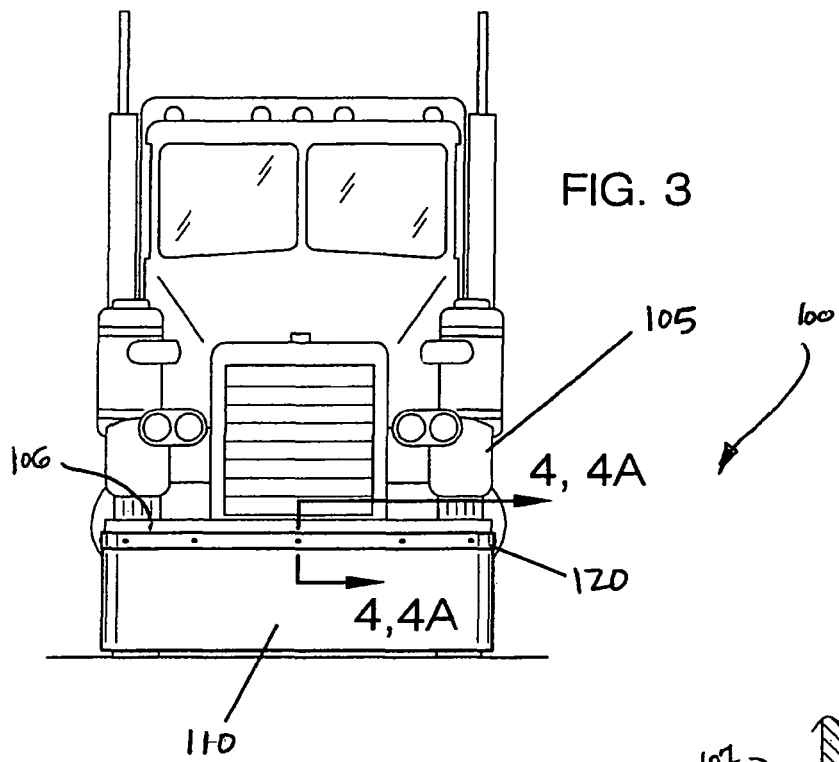
FIG. 3 is a front view of the air dam device of the present invention.

The following is a listing of numbers corresponding to a particular element referred to herein:
100 air dam device
105 truck
106 bumper of truck
107 front surface of bumper
108 lower wing of bumper
110 panel
111 first side edge of panel
112 second side edge of panel
113 top edge of panel
114 bottom edge of panel
115 front surface of panel
116 back surface of panel
120 mounting strip
121 first end of mounting strip
122 second end of mounting strip
125 mounting bracket
126 first half of mounting bracket
127 second half of mounting bracket
130 bolt
131 flat end of bolt
132 threaded end of bolt
140 nut
150 strip aperture
155 panel aperture Referring now to FIGS. 1-5, the present invention features an improved air dam device 100 for attaching to a bumper 106 of a vehicle such as a truck 105 or a car. In some embodiments, the air dam device 100 of the present invention helps to redirect airflow around the outer sides of the vehicle (e.g., truck 105). In some embodiments, the air dam device 100 of the present invention helps to prevent wind turbulence beneath the chassis of the vehicle (e.g., truck 105). Without wishing to limit the present invention to any theory or mechanism, it is believed that the air dam device 100 of the present invention is advantageous because it can help to improve fuel economy. It is also believed that the air dam device 100 of the present invention is long-lasting as it does not have moveable parts.

The air dam device 100 comprises an elongated panel 110 (e.g., constructed from a flexible neoprene/polychloroprene) having a first side edge 111, a second side edge 112, a top edge 113, a bottom edge 114, a front surface 115, and a back surface 116. Disposed on the front surface 115 of the panel 110 and running along the top edge 113 of the panel 110 is an elongated mounting strip 120 for allowing the panel 110 to be mounted on a bumper 106 of a car of a truck 105. The mounting strip 120 has a first end 121 and a second end 122. In some embodiments, the first end 121 is oriented near or at the first side edge 111 of the panel 110. In some embodiments, the second end 122 is oriented near the second side edge 112 of the panel 110.

Without wishing to limit the present invention to any theory or mechanism, it is believed that a panel 110 constructed from a polychloroprene material is advantageous because it is extremely durable, flexible, and has a high amount of tensile strength and elasticity. It is also believed that the flexibility and durability of the air dam 100 of the present invention is advantageous because it allows the device 100 to bend and accommodate debris or objects on the surface of the road. For example, the flexibility of durability of the polychloroprene panel 110 allows the device 100 to withstand contact with an animal or other large object in the road and bend such that the object does not get stuck on the front surface 115 of the panel 110 as it can with a rigid air dam.

The panel 110 of the air dam 100 of the present invention is flexible and is of a thickness that can withstand wind at a high velocity but can also bend and accommodate objects on the road surface. For example, in some embodiments, the panel 110 is about ¾ inch in thickness. This combination of flexibility and thickness also allow the panel 110 to be wrapped around the corners of the bumper 106.

Disposed along the mounting strip 120 is one or more strip apertures 150, which can receive an attachment means such as a bolt 130, a screw, a nail, the like, or a combination thereof. Disposed along the panel 110, for example along the top edge 113 is one or more panel apertures 155, which can receive the attachment means (e.g., bolt 130) that is driven through the strip aperture 150 (see FIG. 2).

The panel apertures 155 are aligned with the strip apertures 150 so that a user can attach the panel 110 to the bumper 106 of the vehicle (e.g., truck 105) via the mounting strip 120.

In some embodiments, the air dam device 100 is mounted on the front surface 107 of the bumper 106 of the vehicle (e.g., truck 105). In some embodiments, the panel 110 is attached to the bumper 106 of the vehicle by aligning the top edge 113 of the panel 110 with the front surface 107 of the bumper 106 and then aligning the mounting strip 120 on the top surface 115 of the panel at the top edge 113. Then, a user can insert a bolt 130, a screw, or the like, through the panel apertures 155 and strip apertures 150. In some embodiments, the bolt 130 can be secured with a nut 140. For example, the bolt 130 has a threaded end 132 and a flat end 131. In some embodiments, a nut 140 can be attached to the threaded end 132 after the threaded end 132 has been driven through the mounting strip 120, panel 110, and bumper 106 (see FIG. 4).

Figure 4:
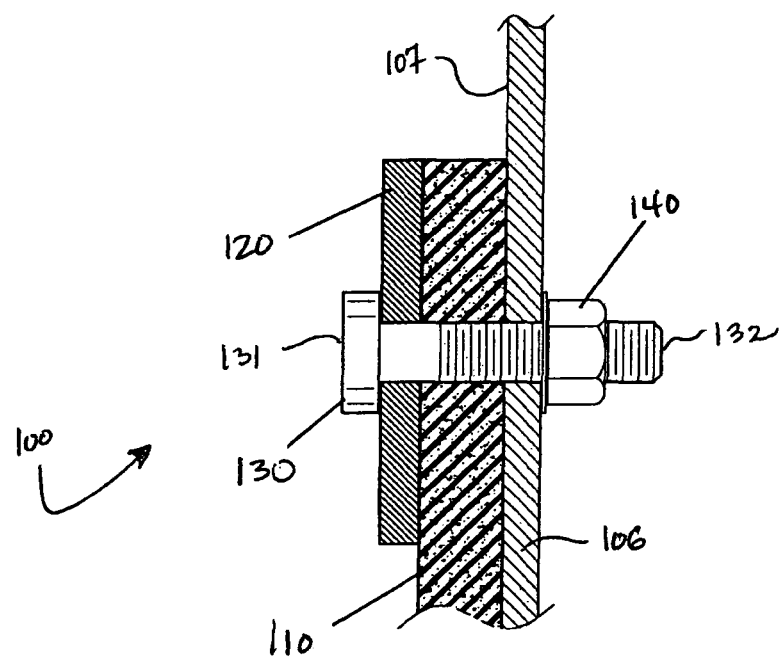
FIG. 4 is a first side cross sectional view of an air dam device of the present invention.
Figure 4A:
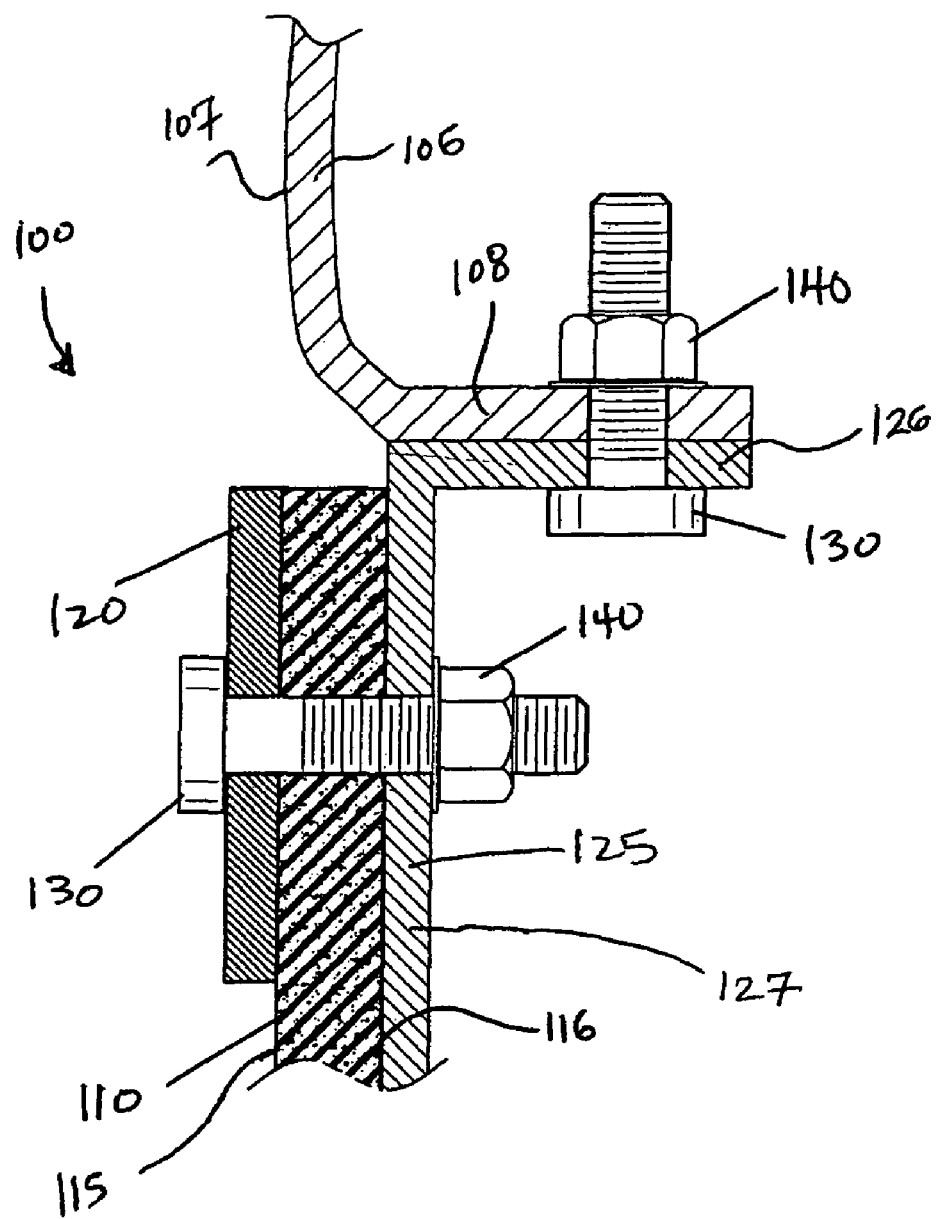
FIG. 4A is a second side cross sectional view of an air dam device of the present invention.
Figure 5:
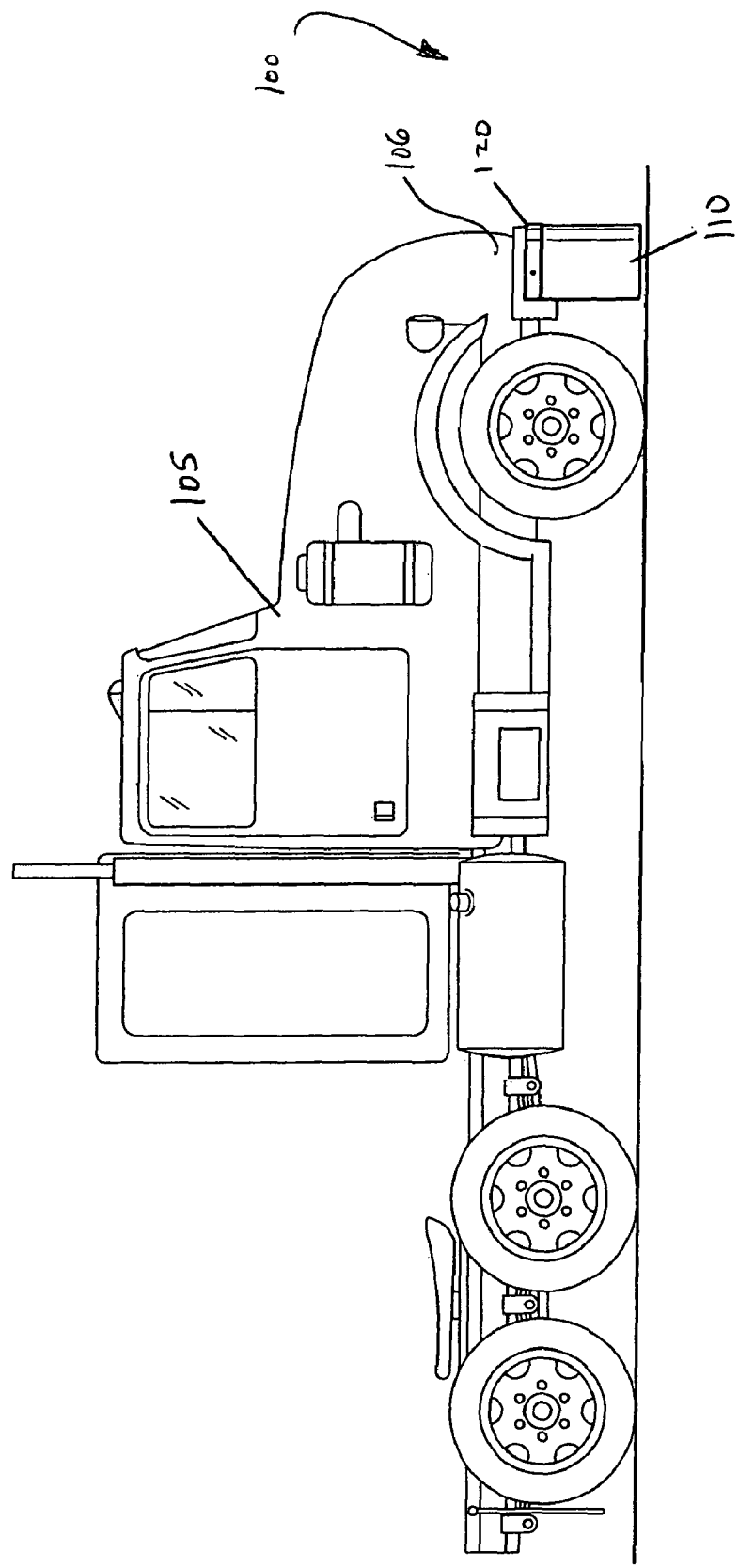
FIG. 5 is a side view of the air dam device of the present invention.

In some embodiments, the air dam device 100 is mounted on a lower wing 108 of the bumper 106 via a mounting bracket 125. In some embodiments, the mounting bracket 125 is generally L-shaped having a first half 126 and a second half 127. In some embodiments, a mounting bracket 125 (e.g., first half 126 of mounting bracket 125) is attached to the lower wing 108 of the bumper 106 via an attachment means, for example a bolt 130 and nut 140. The mounting bracket 125 (e.g., second half 127) extends downwardly from the bumper 106. The panel 110 and mounting strip 120 can be attached to the mounting bracket 125 (e.g., second half 127) via an attachment means, for example a bolt 130 and nut 140 (see FIG. 4A).

The air dam device 100 extends downwardly (e.g., toward the ground surface) from the bumper 106 such that it is close to the ground surface (e.g., pavement) so as to redirect airflow while the vehicle (e.g., truck 105) is moving forward. In some embodiments, the panel 110 is generally flat. In some embodiments, the first side edge 111 and/or second side edge 112 of the panel 110 are generally curved so as to wrap around the lower corners of the bumper 106 of the vehicle (e.g., truck 105) (see FIG. 3, FIG. 5). In some embodiments, the first side edge 111 and/or second side edge 112 of the panel almost touch the front steering tires of the vehicle (e.g., truck 105).

The air dam device 100 of the present invention may be constructed from a variety of materials. For example, in some embodiments, the air dam device 100 is constructed from a material comprising a metal (e.g., steel, aluminum, iron), a plastic, a rubber (e.g., neoprene/polychloroprene rubber), the like, or a combination thereof. Without wishing to limit the present invention to any theory or mechanism, it is believed that the panel 110 being constructed from a flexible polychloroprene rubber is advantageous because it is extremely durable and flexible.

The air dam device 100 of the present invention may be constructed in a variety of sizes so as to fit various sizes of vehicles (e.g., commercial truck 105). In some embodiments, the air dam device 100 is attached to after-market vehicles. In some embodiments, the air dam device 100 is installed in vehicles during production.

In some embodiments, the panel 110 is between about 60 to 80 inches in length as measured from the first side edge 111 to the second side edge 112. In some embodiments, the panel 110 is between about 80 to 110 inches in length as measured from the first side edge 111 to the second side edge 112. In some embodiments, the panel 110 is between about 110 to 120 inches in length as measured from the first side edge 111 to the second side edge 112. In some embodiments, the panel 110 is between about 120 to 130 inches in length as measured from the first side edge 111 to the second side edge 112. In some embodiments, the panel 110 is between about 130 to 150 inches in length as measured from the first side edge 111 to the second side edge 112. In some embodiments, the panel 110 is more than about 150 inches in length.

In some embodiments, the panel 110 is between about 10 to 15 inches in height as measured from the top edge 113 to the bottom edge 114. In some embodiments, the panel 110 is between about 15 to 20 inches in height as measured from the top edge 113 to the bottom edge 114. In some embodiments, the panel 110 is between about 20 to 25 inches in height as measured from the top edge 113 to the bottom edge 114. In some embodiments, the panel 110 is more than about 25 inches in height. In some embodiments, the panel 110 is more than about 10 inches in height.

In some embodiments, the panel 110 is between about ¼ inch and ½ inch in thickness as measured form the front surface 115 to the back surface 116. In some embodiments, the panel 110 is between about ½ inch and ¾ inch in thickness as measured form the front surface 115 to the back surface 116. In some embodiments, the panel 110 is more than about ¾ inch in thickness.

As used herein, the term "about" refers to plus or minus 10% of the referenced number. For example, an embodiment wherein the panel 110 is about 130 inches in length includes a panel 110 that is between 117 and 143 inches in length.

The following the disclosures of the following U.S. Patents are incorporated in their entirety by reference herein: U.S. Pat. No. 4,585,262; U.S. Pat. No. 4,119,339; U.S. Pat. No. 4,915,441; U.S. Pat. No. 4,904,016; U.S. Pat. No. 3,869,166; U.S. Pat. No. 2,036,560; U.S. Pat. No. 4,291,911; U.S. Pat. No. 4,758,037; U.S. Pat. No. 6,079,769.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A flexible aerodynamic air dam device comprising:
   (a) a flexible polychloroprene panel adapted for mounting on a front bumper of a vehicle, wherein the polychloroprene panel can wrap around a first outer side corner and a second outer side corner of the bumper;
   (b) a mounting strip positioned along a top edge of the panel for holding the panel in place by clamping the panel between the mounting strip and the bumper, wherein the mounting strip is constructed from a rigid material including a metal;
   (c) a bolt for inserting through a coinciding strip aperture, panel aperture, and bumper of a vehicle, wherein the bolt together with a nut secure the mounting strip and the panel to the bumper.

2. The air dam device of claim 1, wherein the mounting strip has a height of about that of the bumper.

3. The air dam device of claim 1, wherein the air dam device is mounted on a lower wing of the bumper via a mounting bracket.

4. The air dam device of claim 1, wherein the air dam device is attached to an after-market vehicle.

5. The air dam device of claim 1, wherein the air dam device is attached to a vehicle during production.

* * * * *